US012091984B2

(12) United States Patent
Kuropatwa et al.

(10) Patent No.: US 12,091,984 B2
(45) Date of Patent: Sep. 17, 2024

(54) ROTOR ASSEMBLY FOR A GAS TURBINE ENGINE

(71) Applicants: General Electric Company, Schenectady, NY (US); General Electric Company Polska Sp. z o.o., Warsaw (PL)

(72) Inventors: Michal Tomasz Kuropatwa, Warsaw (PL); Adam Wojciech Deskiewicz, Warsaw (PL); Robert Kaminski, Warsaw (PL); Adam Kunicki, Warsaw (PL); Nicholas Joseph Kray, Mason, OH (US)

(73) Assignees: General Electric Company, Cincinnati, OH (US); General Electric Company Polska Sp. z o.o., Warsaw (PL)

( * ) Notice: Subject to any disclaimer, the term of this patent is extended or adjusted under 35 U.S.C. 154(b) by 0 days.

(21) Appl. No.: 18/081,844

(22) Filed: Dec. 15, 2022

(65) Prior Publication Data

US 2024/0117741 A1 Apr. 11, 2024

(30) Foreign Application Priority Data

Oct. 5, 2022 (PL) .......................................... 442447

(51) Int. Cl.
*F01D 5/02* (2006.01)
*F01D 5/30* (2006.01)

(52) U.S. Cl.
CPC ............... *F01D 5/027* (2013.01); *F01D 5/30* (2013.01); *F05D 2220/32* (2013.01); *F05D 2240/24* (2013.01); *F05D 2260/96* (2013.01)

(58) Field of Classification Search
CPC .... F01D 5/3023; F01D 5/3069; F01D 5/3084; F01D 5/32; F01D 5/284; F01D 5/027; F01D 5/30; F01D 5/225; F01D 5/3053; F01D 5/146; F05D 2240/80; F05D 2240/24; F05D 2260/36; F04D 29/34; F04D 29/662; F04D 29/322
See application file for complete search history.

(56) References Cited

U.S. PATENT DOCUMENTS

| | | | | | |
|---|---|---|---|---|---|
| 2,221,685 | A * | 11/1940 | Smith | F01D 5/3046 | 416/212 A |
| 4,098,559 | A | 7/1978 | Price | | |
| 4,221,542 | A | 9/1980 | Acres et al. | | |
| 4,797,065 | A * | 1/1989 | Conlow | F01D 5/323 | 416/213 R |
| 5,735,673 | A | 4/1998 | Matheny et al. | | |

(Continued)

FOREIGN PATENT DOCUMENTS

CN 113530607 B 7/2022

*Primary Examiner* — Sabbir Hasan
*Assistant Examiner* — Arthur Paul Golik
(74) *Attorney, Agent, or Firm* — Dority & Manning, P.A.

(57) ABSTRACT

A rotor assembly is provided, along with gas turbine engines for its use. The rotor assembly may include a spool defining a plurality of apertures arranged in a first row and spaced circumferentially around the spool, wherein each aperture of the plurality of apertures extends through the spool from a radially inward-facing surface to a radially outward-facing surface; and a blade assembly comprising at least two blades connected to each other via a platform, wherein each blade extends through a respective aperture.

16 Claims, 5 Drawing Sheets

(56) References Cited

U.S. PATENT DOCUMENTS

| | | | | |
|---|---|---|---|---|
| 7,037,078 | B2 | 5/2006 | Soupizon et al. | |
| 9,303,520 | B2 | 4/2016 | Hasting et al. | |
| 9,482,095 | B2 | 11/2016 | Drane | |
| 9,777,585 | B2 | 10/2017 | Drane | |
| 10,422,340 | B2 | 9/2019 | Kray et al. | |
| 2011/0200440 | A1 | 8/2011 | Stiehler | |
| 2016/0130955 | A1* | 5/2016 | Kray | F01D 5/3038 29/889.71 |
| 2016/0376904 | A1* | 12/2016 | Schwarz | F01D 11/001 415/230 |
| 2018/0128119 | A1* | 5/2018 | Hummel | G01M 1/36 |
| 2018/0163556 | A1* | 6/2018 | Dubosc | F04D 29/667 |
| 2019/0162073 | A1* | 5/2019 | Tyagi | F01D 11/008 |
| 2021/0222557 | A1 | 7/2021 | Roberge | |
| 2021/0222574 | A1 | 7/2021 | Roberge | |
| 2022/0082021 | A1* | 3/2022 | Friedman | B23C 5/00 |

* cited by examiner

ROTOR ASSEMBLY FOR A GAS TURBINE ENGINE

PRIORITY INFORMATION

The present application claims priority to Polish Patent Application Number P.442447 filed on Oct. 5, 2022.

FIELD

The present disclosure relates to a rotor assembly for use in a gas turbine engine.

BACKGROUND

A typical gas turbine engine generally possesses a forward end and an aft end with its several core or propulsion components positioned axially therebetween. An air inlet or intake is at a forward end of the engine. Moving toward the aft end, in order, the intake is followed by an engine core including a high pressure compressor, a combustion chamber, and a high pressure turbine. It will be readily apparent from those skilled in the art that additional components may also be included in the engine, such as, for example, low-pressure compressors and low-pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy wherein each set of stator vanes turns and accelerates the combustion gases to engage an adjacent row of rotating turbine blades.

Located aft of the fan is a low pressure compressor, also referred to as a booster. The booster comprises a spool which rotates with a plurality of blades to increase air pressure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DEFINITIONS

Figure 1:
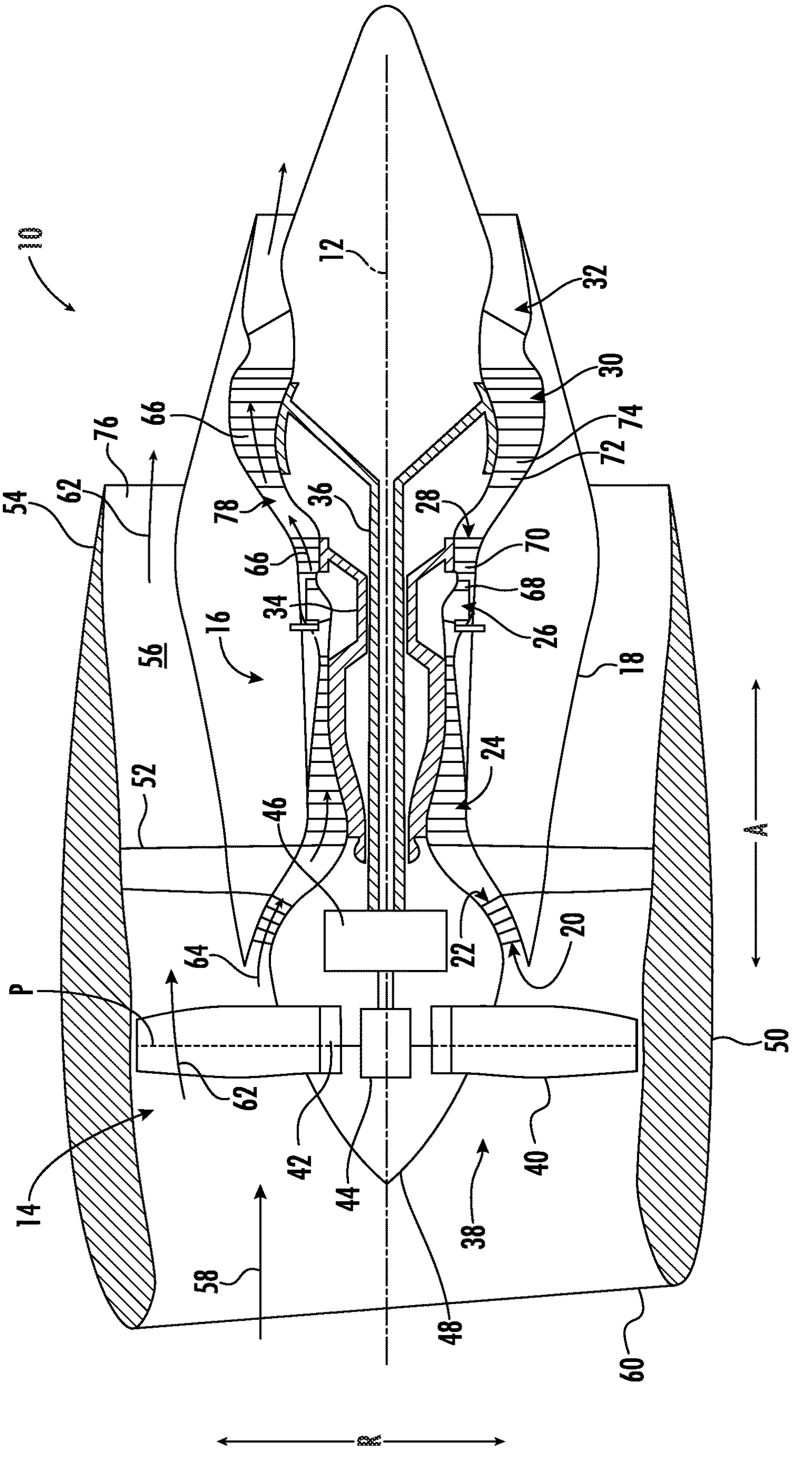
FIG. 1 is a cross-sectional view of a gas turbine engine in accordance with an exemplary aspect of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the terms "first", "second", and "third" may be used interchangeably to distinguish one component from another and are not intended to signify location or importance of the individual components.

As used herein, the term "monolithic" as used to describe a structure refers to the structure being formed integrally of a continuous material or group of materials with no seams, connections joints, or the like.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Current spool structures are formed of metal or composite/metallic systems. These systems also include blades which are integrally formed with the spool. Such integral formation results in more difficult maintenance for the engine. For example, if one integral blade breaks, the entire spool or large sections thereof must be replaced in order to replace the blade and this results in maintenance which is more difficult and more complex to perform. It would also be desirable to provide such lightweight configuration in a manner that need not require replacement of entire assemblies or large portions thereof for a single structure breakage or replacement.

A rotor assembly is generally provided, along with methods of its installation and use (e.g., within a gas turbine engine). The rotor assembly generally includes two or more blades extending from a platform to form a blade assembly. Such a blade assembly may be installed within a spool from inside, with the blades protruding through respective apertures defined in the spool. In particular embodiments, the platform may be positioned to contact an inner surface of the spool such that the platform carries all centrifugal loads. Thus, minimal retention devices may be utilized to save weight and complexity in the resulting rotor assembly. Finally, the combined blade can be equipped with a dedicated feature preventing from fall out due to gravity forces while not in use (e.g., during assembly process).

As stated, the rotor assembly may be utilized in a gas turbine engine. Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan engine 10, referred to herein as "turbofan engine 10." As shown in FIG. 1, the turbofan engine 10 defines an axial direction A (extending parallel to a longitudinal axis 12 provided for reference) and a radial direction R. In general, the turbofan engine 10 includes a fan section 14 and a core turbine engine 16 disposed downstream from the fan section 14. Although described below with reference to a turbofan engine 10, the present disclosure is applicable to turbomachinery in general, including turbojet, turboprop, and turboshaft gas turbine engines, including industrial and marine gas turbine engines and auxiliary power units. It is also applicable to other high temperature applications that contain water vapor in the gas phase, such as those arising from combustion of hydrocarbon fuels.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP spool 36 across an optional power gear box 46. The power gear box 46 includes a plurality of gears for stepping down the rotational speed of the LP spool 36 to a more efficient rotational fan speed.

Referring still to the exemplary embodiment of FIG. 1, the disk 42 is covered by a rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

Referring now to FIGS. 2A, 2B, 3A, 3B, and 4, embodiments of exemplary rotor assemblies 100 are shown. Each rotor assembly 100 may be utilized with any of the rotor blades in the engine 10 shown in FIG. 1, such as within any or all of the LP compressor 22, the HP compressor 24, the HP turbine 28, and/or the LP turbine 30.

In FIGS. 2A, 2B, 3A, 3B, and 4, the exemplary rotor assemblies 100 include a spool 102 having a radially inward-facing surface 104 and a radially outward-facing surface 106. The spool 102 defines a plurality of apertures *108a*, *108b* arranged in a row and spaced circumferentially around the spool 102. Each aperture *108a*, *108b* extends from the radially inward-facing surface 104 to the radially outward-facing surface 106. Although shown with a first aperture *108a* and a second aperture *108b*, it is understood that any number of apertures *108a*, *108b* may be defined within the spool 102.

A blade assembly 110 is shown that includes at least two blades *112a*, *112b* (shown as a first blade *112a* and a second blade *112b*). Each blade 112 extends through a respective aperture *108a*, *108b* (e.g., the first blade *112a* and the second blade *112b* extends through the first aperture *108a* and the second aperture *108b*, respectively). A platform 114 connects each of the blades 112 by extending therebetween. Although shown having two blades 112, it is understood that the blade assembly 110 may have more than two blades 112. However, the presence of too many blades 112 in the blade assembly 110 may lead to diminishing advantages of the blade assembly 110. In particular embodiments, the blade assembly 110 may have 2 to 5 blades 112, such as 2 blades 112 (as shown in FIGS. 2A, 2B, 3A, 3B, and 4), 3 blades 112, 4 blades 112, or 5 blades 112.

Figure 2A:
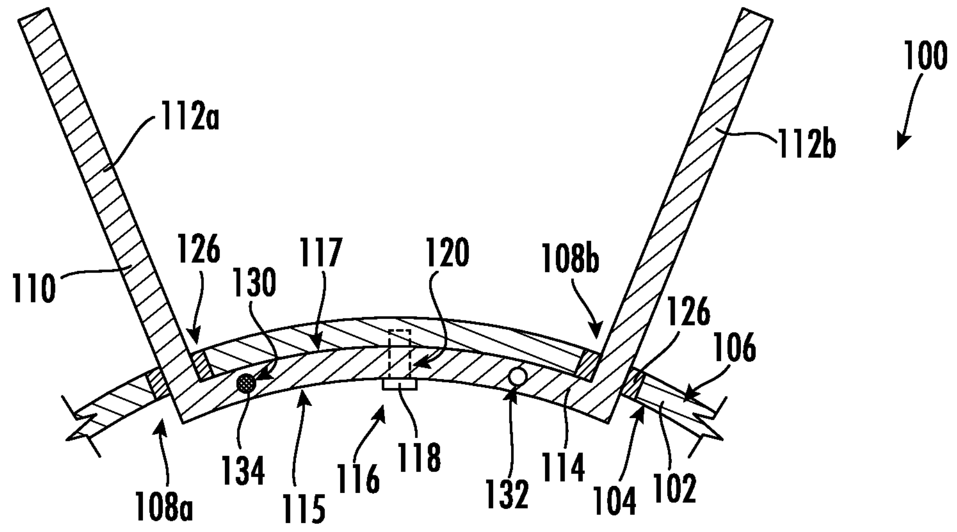
FIG. 2A is cross-sectional diagram of a rotor assembly in accordance with an exemplary aspect of the present disclosure.
Figure 2B:
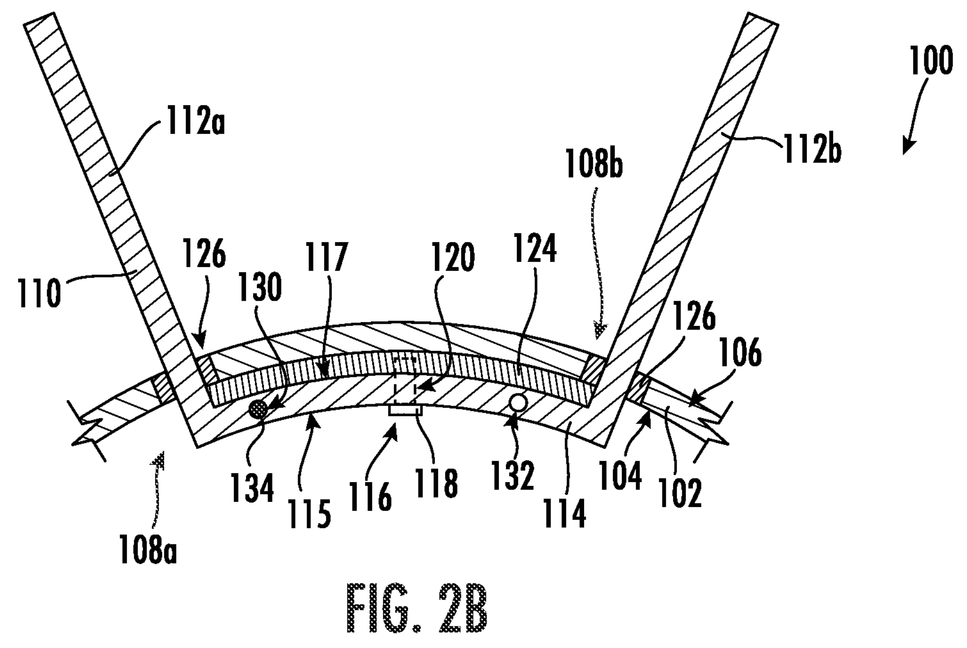
FIG. 2B is cross-sectional diagram of a rotor assembly in accordance with an exemplary aspect of the present disclosure.
Figure 3A:
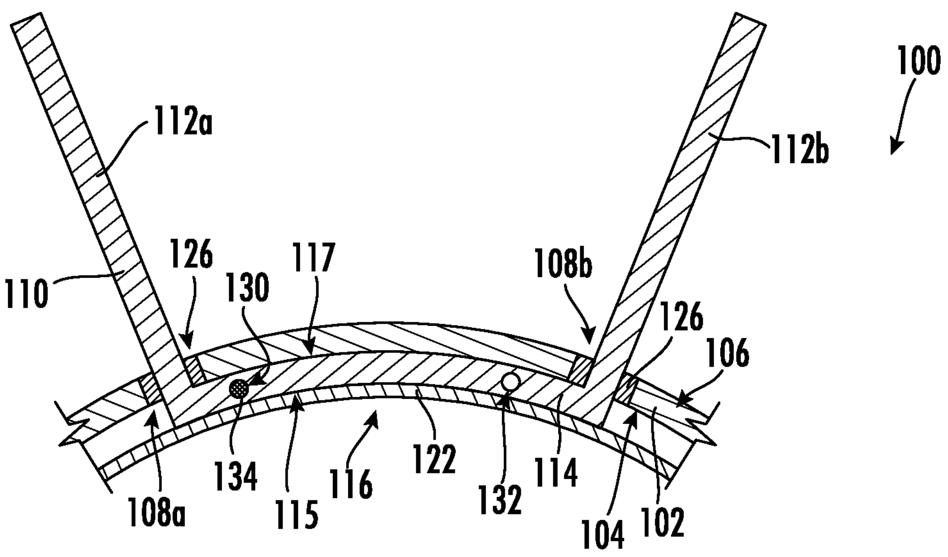
FIG. 3A is cross-sectional diagram of a rotor assembly in accordance with an exemplary aspect of the present disclosure.
Figure 3B:
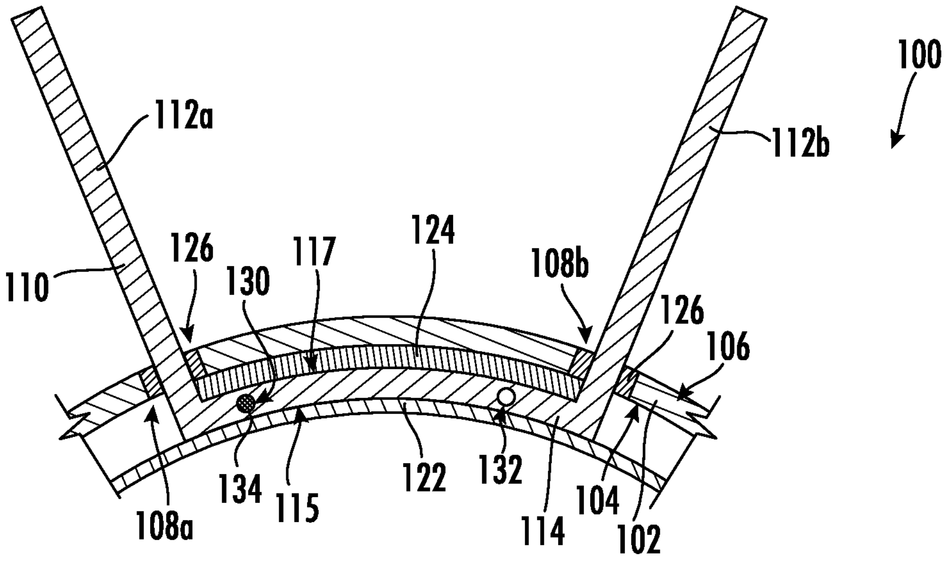
FIG. 3B is cross-sectional diagram of a rotor assembly in accordance with an exemplary aspect of the present disclosure.

A retention device 116 may be positioned in contact with the blade assembly 110. The retention device 116 may hold or secure the blade assembly 110 on the radially inward-facing surface 104 of the spool 102, either directly or indirectly. For example, FIGS. 2A and 2B show fasteners 118 extending through an aperture 120 within the platform 114 and attaching to the radially inward-facing surface 104 of the spool 102. Such a fastener 118 may be a screw, a bolt, a pin, or the like that holds or secures the blade assembly 110 on the radially inward-facing surface 104 of the spool 102. In another example, FIGS. 3A and 3B show retention rings 122 positioned adjacent to a radially inward surface 115 of the platform 114 to hold the blade assembly 110 in place. Such retention rings 122 may be sized and/or biased to apply a force pushing the blade assembly 110 radially outward.

In the embodiments of FIGS. 2A, 2B, 3A and 3B, the platform 114 has a radially outward surface 117 that substantially conforms to the radially inward-facing surface 104 of the spool 102. As such, the shape of the radially outward surface 117 of the platform 114 and the radially inward-facing surface 104 of the spool 102 may be substantially matched to maximize a surface area of contact (directly or indirectly) to minimize strain, friction, and other forces acting on or between them. FIGS. 2A and 3A show embodiments where the radially outward surface 117 of the platform 114 is in direct contact with the radially inward-facing surface 104 of the spool 102. In the alternative embodiments of FIGS. 2B and 3B, the radially outward surface 117 of the platform 114 indirectly contacts the radially inward-facing surface 104 of the spool 102. For example, as shown in FIGS. 2B and 3B, a spacer 124 is positioned between the radially inward-facing surface 104 of the spool 102 and the radially outward surface 117 of the platform 114.

Referring again to FIGS. 2A, 2B, 3A and 3B, a sealing member 126 may be positioned within each aperture *108a*, *108b* to couple the blade *112a*, *112b* with the respective spool 102. The sealing member 126 may provide a barrier for fluid to pass through the aperture 108, as well as securing the fit of the blade 112 within the aperture 108.

In certain embodiments, the rotor assembly 100 may further include at least one balancing component 130. For example, the balancing component 130 may include a plurality of voids 132 formed in the spool 102 and/or blade assembly 110 (e.g., within the platform 114). Such voids 132 may be spaced apart in a manner to reduce the weight of the rotor assembly 100 and to provide a location for a balancing component 130 to be included therein. When present, the at least one balancing component 130 may further include at least one balancing mass 134 (e.g., a pin, rod, bolt, etc.) positioned within at least one of the plurality of voids 132. By selective positioning of the balancing mass 134 within selected voids 132, the rotor assembly 100 may be balanced circumferentially.

Figure 4:
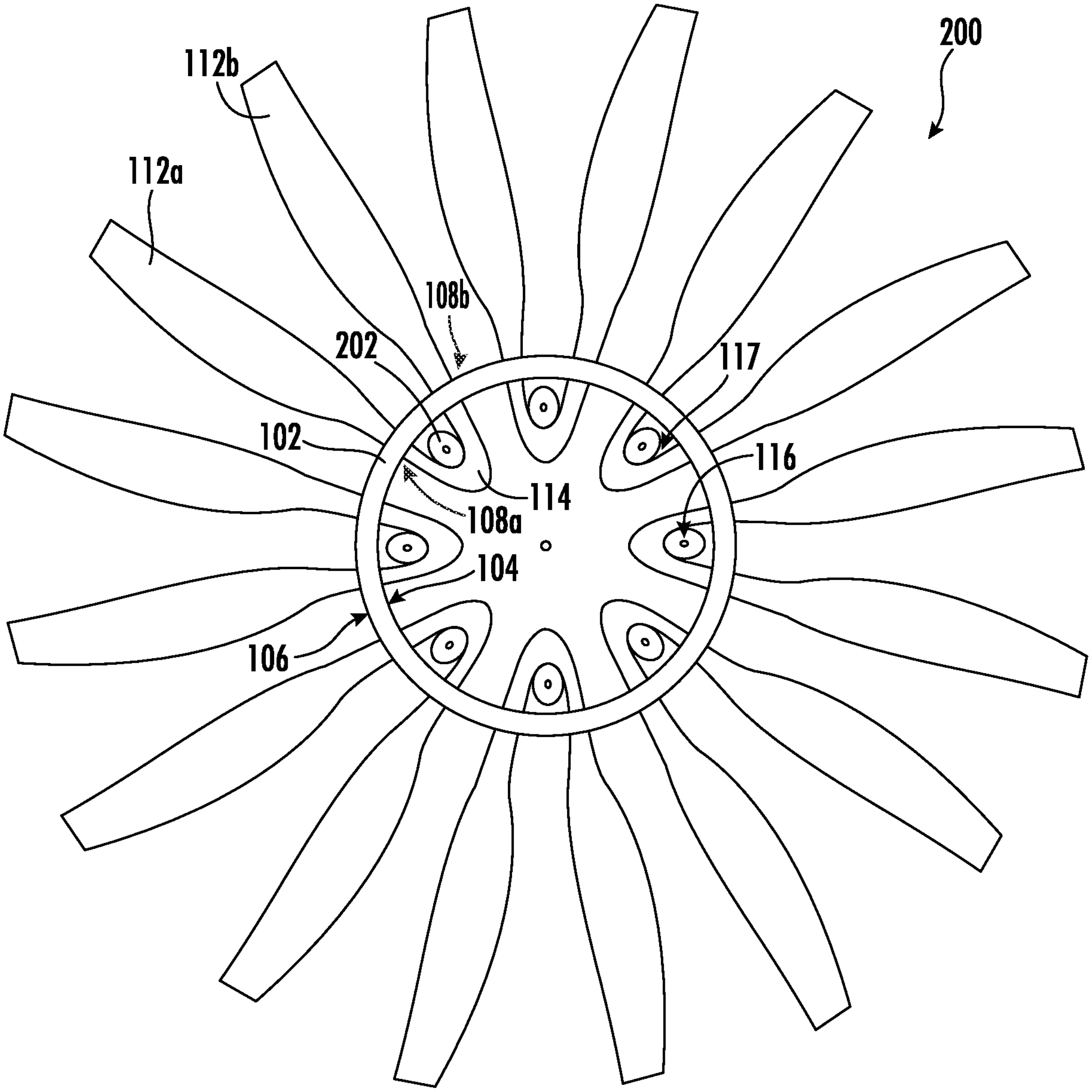
FIG. 4 is cross-sectional diagram of a rotor assembly in accordance with an exemplary aspect of the present disclosure.

Referring to FIG. 4, a rotor assembly 200 is shown having a retention device 116, being a pin 202, positioned between the platform 114 and the radially inward-facing surface 104 of the spool 102. In the shown embodiment, the platform 114 has a radially outward surface 117 with a shape configured to accept the pin 202 between the radially inward-facing surface 104 of the spool 102 and the radially outward surface 117 of the platform 114.

Figure 5A:
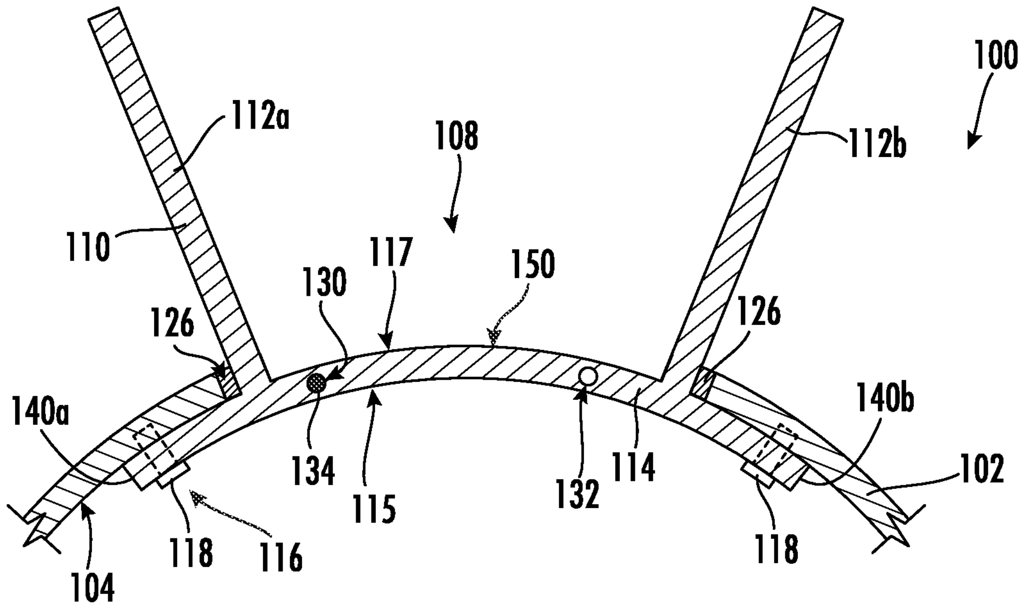
FIG. 5A is cross-sectional diagram of a rotor assembly in accordance with an exemplary aspect of the present disclosure.
Figure 5B:
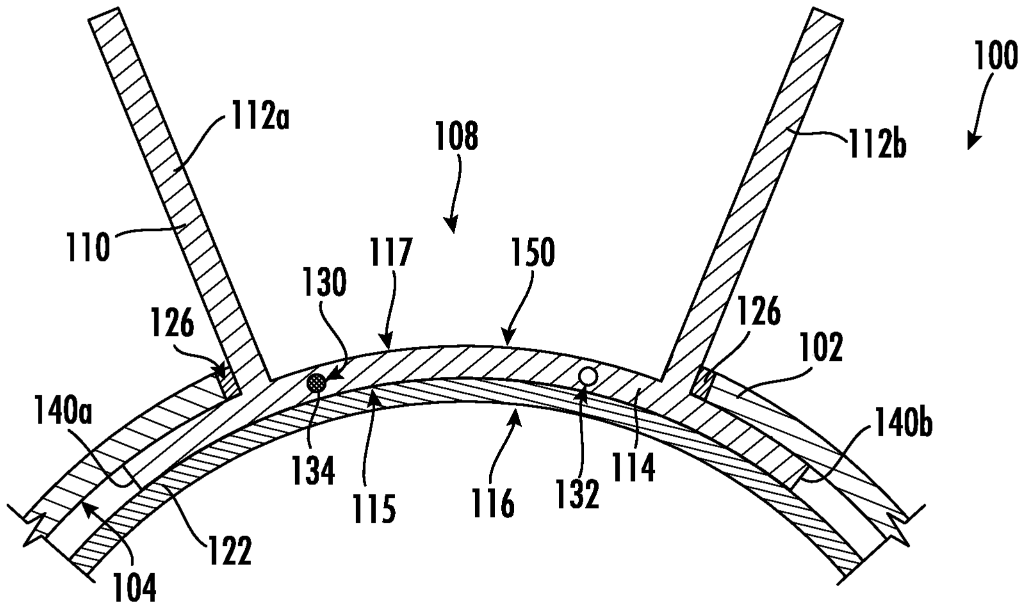
FIG. 5B is cross-sectional diagram of a rotor assembly in accordance with an exemplary aspect of the present disclosure.

Referring now to FIGS. 5A and 5B, additional embodiments of exemplary rotor assemblies 100 are shown. Similar to the embodiments shown in FIGS. 2A, 2B, 3A, and 3B, each rotor assembly 100 may be utilized with any of the rotor blades in the engine 10 shown in FIG. 1, such as within any or all of the LP compressor 22, the HP compressor 24, the HP turbine 28, and/or the LP turbine 30. The exemplary rotor assemblies 100 of FIGS. 5A and 5B have a plurality of apertures *108a*, *108b* arranged in a row and spaced circumferentially around the spool 102, with each aperture *108a*, *108b* extending from the radially inward-facing surface 104 to the radially outward-facing surface 106. The blade assembly 110 includes at least two blades 112 (shown as a first blade *112a* and a second blade *112b*) that extend through a respective common aperture 108. The platform 114 connects each of the blades 112 by extending therebetween and forms a radially outward surface 117 that defines the flow path surface 150 of the hot gas within the turbine. Although shown having two blades *112a*, *112b*, it is understood that the blade assembly 110 may have more than two blades 112*a*, 112*b* within the common aperture 108. However, the presence of too many blades 112*a*, 112*b* in the blade assembly 110 may lead to diminishing advantages of the blade assembly 110. In particular embodiments, the blade assembly 110 may have 2 to 5 blades 112, such as 2 blades 112 (as shown in FIGS. 5A, 5B), 3 blades 112, 4 blades 112, or 5 blades 112.

In the embodiments of FIGS. 5A and 5B, the blade assembly 110 further includes platform wings 140*a*, 140*b* extending from each side of the platform 114 so as to hold the blade assembly 110 within a respective aperture 108. In particular, the platform wings 140*a*, 140*b* interface with the radially inward-facing surface 104 of the spool 102. As such, the retention device 116 may hold or secure the blade assembly 110 on the radially inward-facing surface 104 of the spool 102, either directly or indirectly.

In certain embodiments, including those shown in FIGS. 2A, 2B, 3A, 3B, 4, 5A, and 5B, the blades 112 and the platform 114 form a monolithic structure. That is, the blade assembly 110 may be a monolithic structure. For example, the blade assembly 110 comprises a ceramic matrix composite. Not only may the blade assembly 110 be formed from a CMC, but also the spool 102 may formed from a CMC.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3$ $2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Further aspects are provided by the subject matter of the following clauses:

A rotor assembly comprising: a spool defining a plurality of apertures arranged in a first row and spaced circumferentially around the spool, wherein each aperture of the plurality of apertures extends through the spool from a radially inward-facing surface to a radially outward-facing surface; and a blade assembly comprising at least two blades connected to each other via a platform, wherein each blade extends through a respective aperture.

The rotor assembly of any preceding clause, wherein at least one of the spool or the blade assembly comprises a ceramic matrix composite.

The rotor assembly of any preceding clause, wherein the blade assembly further comprises a retention device positioned in contact with the blade assembly.

The rotor assembly of any preceding clause, wherein the retention device comprises a pin between the platform and the radially inward-facing surface of the spool.

The rotor assembly of any preceding clause, wherein the platform has a radially outward surface with a shape configured to accept the pin between the radially inward-facing surface.

The rotor assembly of any preceding clause, wherein the retention device comprises a fastener extending through an aperture within the platform and attaching to the radially inward-facing surface of the spool.

The rotor assembly of any preceding clause, wherein the retention device comprises a retention ring positioned adjacent to an internal surface of the platform.

The rotor assembly of any preceding clause, wherein the platform has a radially outward surface that substantially conforms to the radially inward-facing surface of the spool.

The rotor assembly of any preceding clause, wherein the radially outward surface of the platform is in direct contact with the radially inward-facing surface of the spool.

The rotor assembly of any preceding clause, further comprising: a spacer positioned between the radially inward-facing surface of the spool and a radially outward surface of the platform.

The rotor assembly of any preceding clause, further comprising: a sealing member positioned within each aperture to couple the blade with the spool.

The rotor assembly of any preceding clause, further comprising: at least one balancing component.

The rotor assembly of any preceding clause, wherein the at least one balancing component includes a plurality of voids formed in the spool, in the blade assembly, or both.

The rotor assembly of any preceding clause, wherein the at least one balancing component further comprises at least one balancing mass positioned within at least one of the plurality of voids.

The rotor assembly of any preceding clause, wherein the first blade, the second blade, and the platform form a monolithic structure.

The rotor assembly of any preceding clause, wherein the blade assembly comprises a ceramic matrix composite.

A rotor assembly comprising: a spool defining a plurality of apertures arranged in a first row and spaced circumferentially around the spool, wherein each aperture of the plurality of apertures extends through the spool from a radially inward-facing surface to a radially outward-facing surface; and a blade assembly comprising at least two blades connected to each other via a platform, wherein each blade extends through a common aperture such that the platform defines a flow path surface of the rotor assembly, and wherein the blade assembly further comprises a pair of platform wings.

The rotor assembly of any preceding clause, wherein the blade assembly further comprises a retention device positioned in contact with the blade assembly such that the pair of platform wings are held in contact with the radially inward-facing surface.

The rotor assembly of any preceding clause, further comprising: a sealing member positioned within each aperture to couple the blade with the spool.

The rotor assembly of any preceding clause, further comprising: at least one balancing component.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A rotor assembly comprising:

a spool defining a plurality of apertures spaced circumferentially around the spool, wherein each aperture of the plurality of apertures extends through the spool from a radially inward-facing surface to a radially outward-facing surface; and a blade assembly comprising at least two blades connected to each other via a platform, wherein each blade of the at least two blades extends through a respective aperture of the plurality of apertures, wherein the platform is disposed radially inward of the radially inward-facing surface of the spool and extends circumferentially from a first blade of the at least two blades to a second blade of the at least two blades and has a convex surface facing radially outward.

2. The rotor assembly of claim 1, wherein at least one of the spool or the blade assembly comprises a ceramic matrix composite.

3. The rotor assembly of claim 1, wherein the blade assembly further comprises a retention device positioned in contact with the blade assembly.

4. The rotor assembly of claim 3, wherein the retention device comprises a pin between the platform and the radially inward-facing surface of the spool.

5. The rotor assembly of claim 4, wherein the platform has a radially outward surface with a shape configured to accept the pin between the radially inward-facing surface of the spool and the radially outward surface of the platform.

6. The rotor assembly of claim 3, wherein the retention device comprises a fastener extending through an aperture within the platform and attaching to the radially inward-facing surface of the spool.

7. The rotor assembly of claim 3, wherein the retention device comprises a retention ring positioned adjacent to a radially inward surface of the platform.

8. The rotor assembly of claim 1, wherein the platform has a radially outward surface that conforms to the radially inward-facing surface of the spool.

9. The rotor assembly of claim 8, wherein the radially outward surface of the platform is in direct contact with the radially inward-facing surface of the spool.

10. The rotor assembly of claim 1, further comprising:

a spacer positioned between the radially inward-facing surface of the spool and a radially outward surface of the platform.

11. The rotor assembly of claim 1, further comprising:

a seal positioned within each aperture to couple each blade of the at least two blades with the spool.

12. The rotor assembly of claim 1, further comprising:

at least one balancing component.

13. The rotor assembly of claim 12, wherein the at least one balancing component includes a plurality of voids formed in the spool, in the blade assembly, or both.

14. The rotor assembly of claim 13, wherein the at least one balancing component further comprises at least one balancing mass positioned within at least one of the plurality of voids.

15. The rotor assembly of claim 1, wherein the first blade, the second blade, and the platform form a monolithic structure.

16. The rotor assembly of claim 1, wherein the blade assembly comprises a ceramic matrix composite.

* * * * *